No. 696,058. Patented Mar. 25, 1902.
J. A. LEHRRITTER.
CONCENTRATOR.
(Application filed Oct. 30, 1900.)
(No Model.)
3 Sheets—Sheet 2.
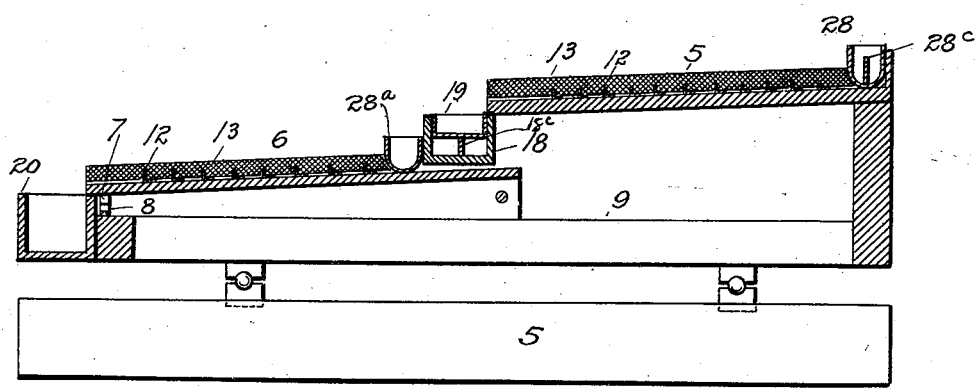
FIG. 3
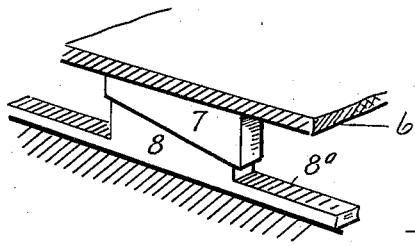
FIG. 4.
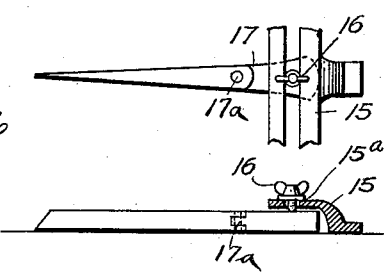
FIG. 5
FIG. 6
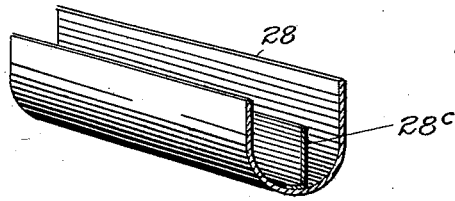
FIG. 7
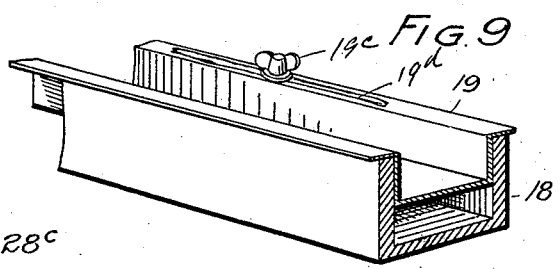
FIG. 9
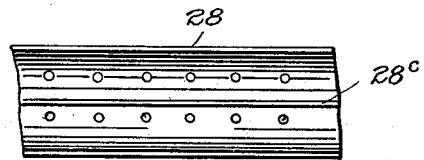
FIG. 8
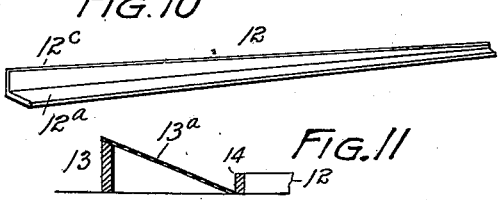
FIG. 10
FIG. 11
WITNESSES:
INVENTOR.
John A. Lehrritter.
BY
ATTORNEY.

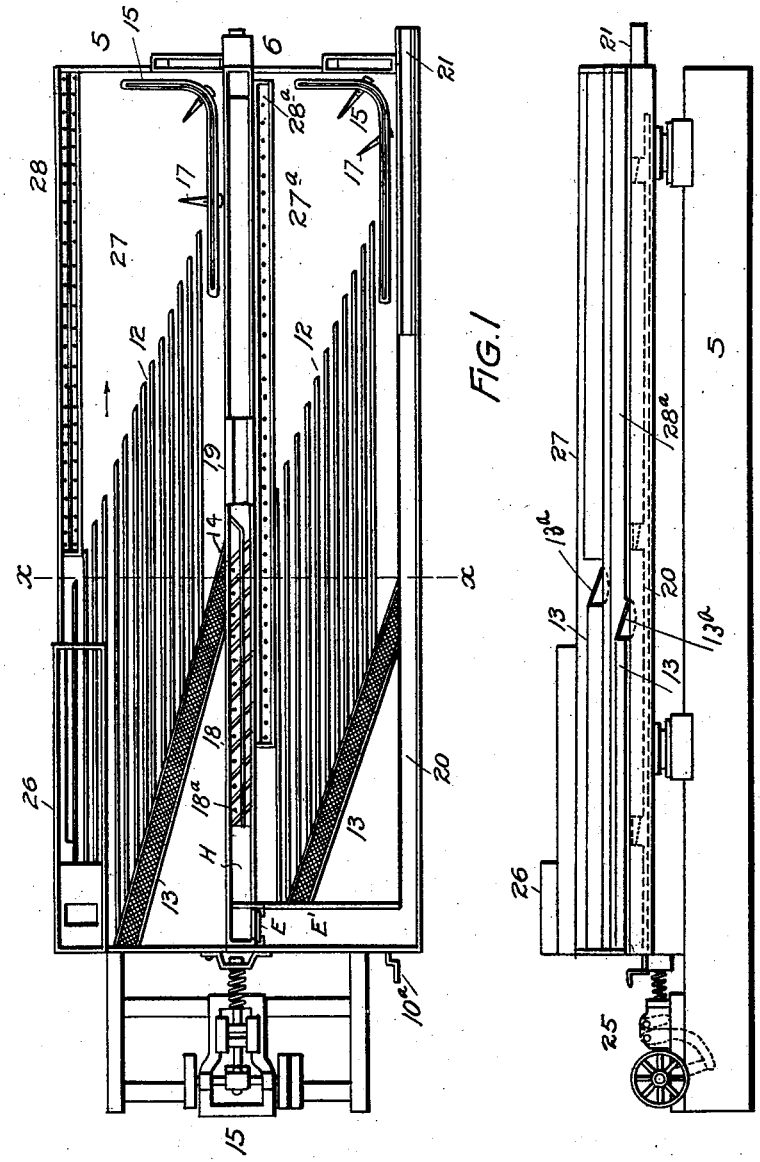

No. 696,058. Patented Mar. 25, 1902.
J. A. LEHRRITTER.
CONCENTRATOR.
(Application filed Oct. 30, 1900.)
(No Model.) 3 Sheets—Sheet 3.

WITNESSES: INVENTOR.
John A. Lehrritter.
ATTORNEY.

UNITED STATES PATENT OFFICE.

JOHN A. LEHRRITTER, OF DENVER, COLORADO.

CONCENTRATOR.

SPECIFICATION forming part of Letters Patent No. 696,058, dated March 25, 1902.

Application filed October 30, 1900. Serial No. 34,965. (No model.)

*To all whom it may concern:*

Be it known that I, JOHN A. LEHRRITTER, a citizen of the United States of America, residing at Denver, in the county of Arapahoe and State of Colorado, have invented certain new and useful Improvements in Concentrators; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in means for concentrating pulverized ore or other material containing mineral values and effecting a separation of the said values from the gangue.

The invention embodies certain features of construction intended to improve and perfect the apparatus set forth in Patent No. 660,342, dated October 23, 1900, all of which will be fully understood by reference to the accompanying drawings, in which—

Figure 12:
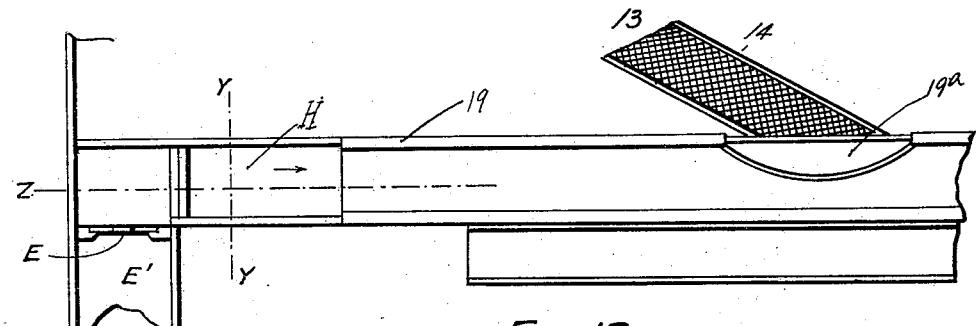
Figure 13:
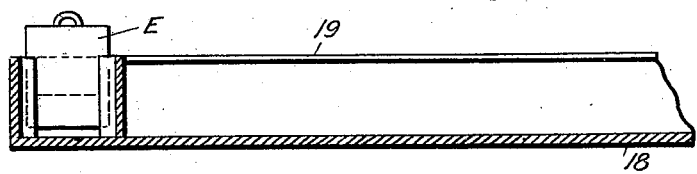
Figure 14:
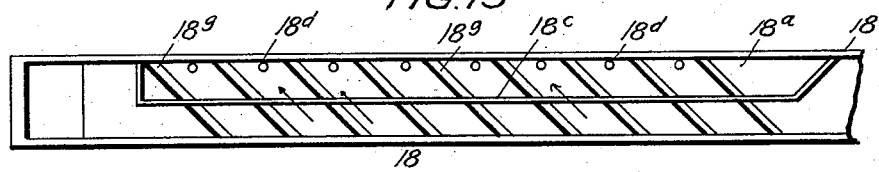
Figure 15:
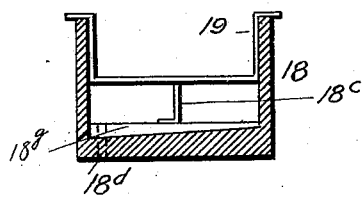
Figure 16:
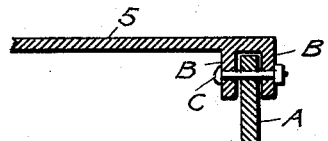
Figure 17:
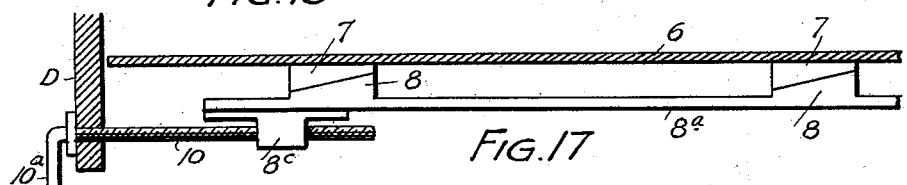
Figure 18:
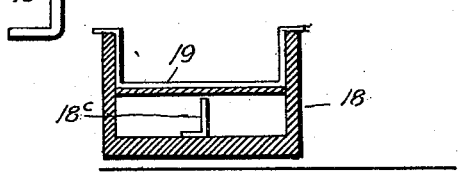
Figure 19:
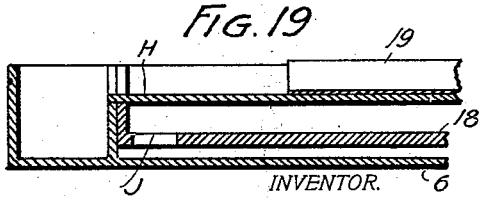

Figure 1 is a top or plan view of a concentrating apparatus equipped with my improvements. Fig. 2 is a side elevation of the same. Fig. 3 is a cross-section taken on the line $x\ x$, Fig. 1. Fig. 4 is a perspective view illustrating the construction for changing the inclination of the lower table. Fig. 5 is an enlarged fragmentary top view of the slotted bar attached to the table, showing one of the separating-fingers in place. Fig. 6 is a section taken through the same. Fig. 7 is a perspective view, on a larger scale, of the divided feed-water trough. Fig. 8 is a top view of the same. Fig. 9 is a perspective view of an auxiliary sliding conveyer adjustably attached to the return-conveyer. Fig. 10 is a perspective view of a flanged metallic riffle. Fig. 11 is a section taken through the slime trough or conveyer. Figs. 12 and 13 are fragmentary top and side views of the upper table, illustrating the tailings trough or conveyer. Fig. 14 is a fragmentary top view of the return-conveyer, showing the slime-compartment. Fig. 15 is a cross-section taken through the same, showing the tailings-trough in place. Fig. 16 shows the manner of hinging the lower table to the upper table. Fig. 17 further illustrates the construction for adjusting the inclination of the lower table. Fig. 18 is a section taken through the return-conveyer on the line $y\ y$, Fig. 12. Fig. 19 is a section taken on the line $z\ z$, Fig. 12.

The same reference characters indicate the same parts in all the views.

Let the numeral 5 designate the relatively stationary base, upon which are mounted two table members 5 and 6, which are normally laterally inclined. (See Fig. 3.) The lower table 6 is hinged at its upper edge to the supporting structure, whereby it is independently adjustable to vary its inclination to correspond with the character of the material to be treated. The material treated by the lower table passes thereto from the upper table and consists of middlings or tailings material containing sufficient mineral values which have escaped from the upper table to justify retreatment. Hence the function of the lower table; but as the material passing to the lower table is different in character from that which is treated by the upper table it is often desirable to change the inclination of the lower table, so that it shall be different from the inclination of the upper table. This independent lateral adjustability of the lower table forms one of my improvements. It may be accomplished in any desired manner. As shown in the drawings, the lower table is provided with arms A, one of which is shown in Fig. 16. These arms are hinged to projections B on the upper table by means of bolts C. (See Fig. 16.) The lower portion of the table 6 is provided with blocks 7, having inclined lower faces, which are engaged by the inclined faces of blocks 8, attached to the bar 8ª. This bar is provided with a lug 8ᶜ, having a threaded opening engaged by an adjusting-screw 10, which is journaled in a part D, stationary with reference to the table part 6. By turning this screw it is evident that the inclination of the table 6 may be regulated at pleasure.

The riffles 12 of each table are angular in cross-section, being provided with a bottom flange 12ª, forming a right angle with the vertical part 12ᶜ. The riffles are so arranged that the flanges 12 project upwardly on the slope of the table's inclination, whereby their exposed edges form an obstruction or shallow riffle part, facilitating the catching of the concentrates on the riffled surface of the table.

The slime-troughs 13 extend diagonally across the head of the respective table members. Each slime-trough marks the line of the head extremities of the riffles. Along each of these troughs 13 and on the side adjacent the riffles is placed a rib or diagonal riffle 14 to prevent the finer concentrates from passing through the wire-cloth screen $13^a$ into the slime-trough. This screen $13^a$ occupies an inclined position and covers the top of each trough. The rib 14 causes an accumulation of water equal to the depth of the rib at the head of the table along the slime-trough to facilitate the concentration and settling of the mineral values. Without the rib 14 the water would be drawn off from the table through the slime-trough. In the operation of a table of this character its tail or the extremity farther to the right (see Figs. 1 and 2) is highest, causing the water to flow naturally toward the head of the table.

Each table is provided at its lower right-hand corner with a slotted bar 15, bent around the corner of the table. Through the slot $15^a$ of this bar are passed thumb-screws 16, to which are attached separating-fingers 17, adapted to be adjusted to separate the concentrates from the middlings or to separate the concentrates into a number of different grades, as may be required. By loosening its thumb-screw any finger may be moved along the bar at will, the stem of the screw sliding in the slot of the bar.

Mounted upon the return-conveyer 18, which receives the middlings discharged from the upper table, is an auxiliary conveyer 19, which may be arranged to receive a grade of tailings containing no mineral values, whereby they may be discharged directly from the machine, thus avoiding the necessity of passing them over the concentrating-surface of the lower table, where they would only be a burden and interfere with the treatment of the middlings discharged thereon from the return-conveyer. These worthless tailings are discharged through an opening controlled by a gate E, whence they pass by way of a trough E', formed at the head of the table 6, to the tailings-conveyer 20 of the said table, whence they are discharged from the machine. It will be understood that whatever is discharged into the conveyer 20 of the lower table is supposed to contain no mineral values. This conveyer 20 of the lower table is also provided with a suitable slidable trough 21, supported on the upper edge of the conveyer and adapted to catch and save the middlings from the lower edge of the tail of the table in case it is desirable to save any portion of the tailings from said table.

The slime-trough 13 of the table 5 is arranged to discharge into a compartment $18^a$, separated from the return-conveyer compartment by a partition $18^c$. In the bottom of this compartment $18^a$ are formed a number of openings $18^d$, through which the slimes pass to the lower table, whose upper edge projects under and below the lower edge of the upper table, whereby the slimes are delivered to the table 6 in the rear or to the right of (see Figs. 1 and 2) the discharge of the middlings to the said table from the head extremity of the return-conveyer 18, whereby these slimes are carried rearwardly or toward the tail of the table by the heavier material in front and saved with the concentrates at the discharge extremity or tail at the extreme right of the table 6. In the bottom of the slime-compartment $18^a$ are formed grooves $18^g$, which are continued across the bottom of the main return-conveyer in order to catch any values that may settle as the material passes toward the head of the conveyer. Whatever is caught in these grooves passes in the direction indicated by the arrows (see Fig. 14) to the upper edge of the lower table and is treated in the same manner as the slimes.

A suitable reciprocating movement is imparted to the entire table construction by operating mechanism 25, which is covered by another application, filed October 15, 1900, Serial No. 33,176. Hence the said operating mechanism will not be described in detail. This operating mechanism, however, imparts a movement which is calculated to cause the concentrates to travel toward the tail of the table or in the direction indicated by the arrows in Fig. 1, while the tailings or gangue is carried downwardly and discharged from the lower edge of the table.

When the apparatus is in use, the material to be treated is discharged in the form of pulp into a feed-box 26, located at the upper left-hand corner of the table 5. (See Figs. 1 and 2.) From this feed-box the material passes to the riffled surface of the table, where the mineral values are caught by the riffles and carried to the plain surface 27 of the table, where the final separation of the mineral from the gangue is effected. The concentrates proper are discharged over the right-hand extremity of the table. (See Figs. 1 and 2.) The worthless tailings are caught by the trough 19, whose position is so regulated that it does not extend far enough toward the tail of the table to catch any middlings or tailings containing values. It will be understood that the nearer the tail of the table a discharge takes place the more likely is the discharged material to contain mineral values. Hence the position of the adjustable trough 19 may be regulated according to the material under treatment. The material caught by the trough 19 is discharged under the gate E into the trough E' and thence into the discharge-conveyer 20 of the lower table. The middlings are discharged into the return-conveyer 18 in the rear of the tailings-conveyer 19 and carried thereby to the lower table for retreatment, as explained in the aforesaid patent. The slimes which pass through the screen 13ᵃ of the slime-trough of the upper table are carried downwardly by the trough 13 and discharged into the slime-compartment 18ᵃ, the trough or conveyer 19 being cut away at 19ᵃ for the purpose. (See Fig. 12.) These slimes which enter the compartment 18ᵃ pass to the lower table, as heretofore explained. The middlings which pass to the lower table are treated in the same manner as the material discharged to the upper table, except that the tailings and slimes trough discharge passes directly into the discharge-conveyer 20, whence it passes as worthless material from the machine. If any values pass over the lower edge of the table 6, it will occur near the extremity of the table farther to the right, (see Figs. 1 and 2,) and these may be caught by the slidable trough 21 and conducted to a suitable receptacle (not shown) for retreatment.

The pure water necessary to effect the final separation of the material from the gangue on the plain portions 27 and 27ᵃ of the tables 5 and 6 is fed to the tables from troughs 28 and 28ᵃ, respectively. These troughs have perforated bottoms. The trough 28 is centrally divided by a partition 28ᶜ. If a comparatively small amount of water is needed, feed-water from a source of water-supply (not shown) is only fed to one compartment of the trough 28. If, however, more wash-water is required, it is fed to both compartments of the trough, thus furnishing a double discharge.

Below the discharge extremity of the tailings-conveyer 19 is formed a partition H, upon which the tailings fall from the conveyer 19 and pass to the upper extremity of the trough E′ and thence into the body of said trough when the gate E is open. The middlings pass to the table 6 through an opening J, formed at the extremity of the return-conveyer 18.

The conveyer 21, heretofore mentioned, is particularly useful to collect the zinc from the lower edge of the table 6, near the tail thereof. This zinc would otherwise pass into the bulk of the tailings and require retreatment, which by this device is avoided. The separating-fingers 17 are provided with joints 17ᵃ, whereby their direction may be changed at pleasure without loosening the set-screws 16.

In further explanation of the function of the metal riffles 12 it may be stated that by using the metal riffles it makes it practicable to employ a greater number of riffles without occupying any more space on the table, since the metal riffles may be formed much thinner than the wooden riffles.

The slidable trough or carrier 19 is held in place by a set-screw 19ᶜ, passing through a slot 19ᵈ, formed in the flange of the trough and made of sufficient length to permit the desired range of adjustability or sliding movement.

Having thus described my invention, what I claim is—

1. A concentrating apparatus comprising a laterally-inclined, riffled table, having a slime-trough extending diagonally across its head at the extremities of the riffles, and provided with a screen through which the slimes pass to the trough, and a rib arranged along the slime-trough between the lower edge of the screen and the riffled portion of the table, to dam the water and also prevent any of the settled concentrates from passing through the screen into the slime-trough.

2. In a concentrating apparatus the combination of two laterally-inclined table-sections, the lower of which is adapted to receive the tailings discharge from the lower edge of the upper table, a slime-trough arranged across the head of the upper table, riffles extending longitudinally on the upper table and terminating at the slime-trough, a return-conveyer for carrying the tailings from the lower edge of the upper table to the head of the lower table, and a compartment separated from the return-conveyer and adapted to receive the slimes from the slime-trough of the upper table, the said compartment being provided with an outlet allowing the slimes to pass to the lower table in the rear of the discharge from the return-conveyer.

3. The combination of two laterally-inclined table-sections, the upper section overlapping the lower section, a return-conveyer arranged along the lower edge of the upper table and adapted to carry the middlings from the upper table to the head of the lower table, a slime-trough arranged across the head of the upper table, and a compartment separated from the return-conveyer and adapted to receive the slimes from the slime-trough of the upper table, the bottom of the slime-trough being provided with escape-openings allowing the slimes to pass to the lower table in the rear of the discharge from the return-conveyer.

4. The combination of two laterally-inclined table-sections, so arranged that the lower edge of the upper table overlaps the upper edge of the lower table, a return-conveyer arranged along the lower edge of the upper table, and adapted to carry the middlings discharge to the head of the lower table, and an auxiliary conveyer located above the return-conveyer and adapted to catch the worthless portion of the tailings and discharge them from the machine.

5. The combination with a laterally-inclined concentrating-table, having a movement adapted to carry the concentrates over the tail of the table, of a slotted bar extending around the lower corner of the tail of the table, set-screws passing through the slot of the bar, and separating-fingers attached to the set-screws whereby the fingers may be adjusted at pleasure.

6. The combination of two laterally-inclined table-sections, a return-conveyer arranged along the lower edge of the upper table and adapted to carry the middlings from the upper table to the head of the lower table, a slime-trough arranged diagonally across the head of the upper table, and a compartment separated from the return-conveyer and adapted to receive the slimes from the slime-trough of the upper table, the said compartment being provided with an outlet allowing the slimes to pass to the lower table in the rear of the discharge from the return-conveyer.

7. The combination with a laterally-inclined concentrating-table having a movement adapted to carry the concentrates over one extremity or the tail of the table, of a bar located at the lower corner of the tail of the table and one or more jointed separating-fingers connected with said bar and adjustable bodily thereon.

In testimony whereof I affix my signature in presence of two witnesses.

JOHN A. LEHRRITTER.

Witnesses:
DORA C. SHICK,
G. J. ROLLANDET.